No. 879,935. PATENTED FEB. 25, 1908.
G. T. WILSON.
RAILWAY FISH PLATE.
APPLICATION FILED MAY 14, 1907.
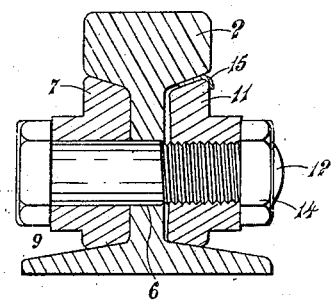
Fig 1
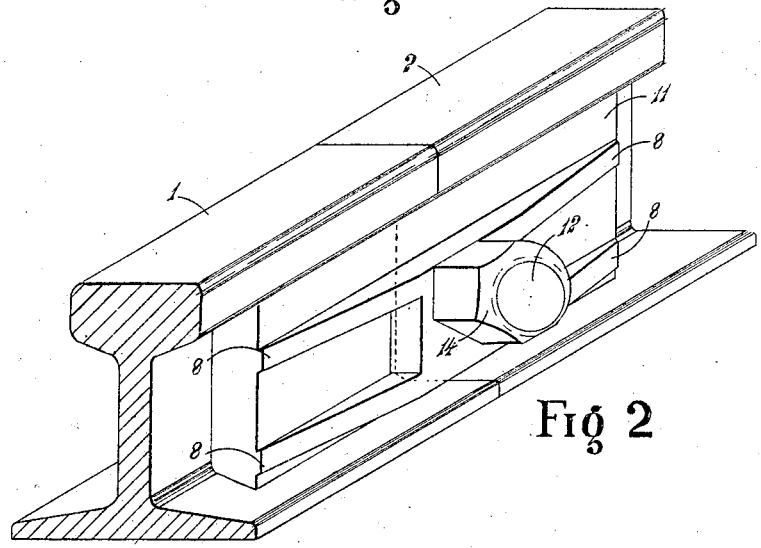
Fig 2
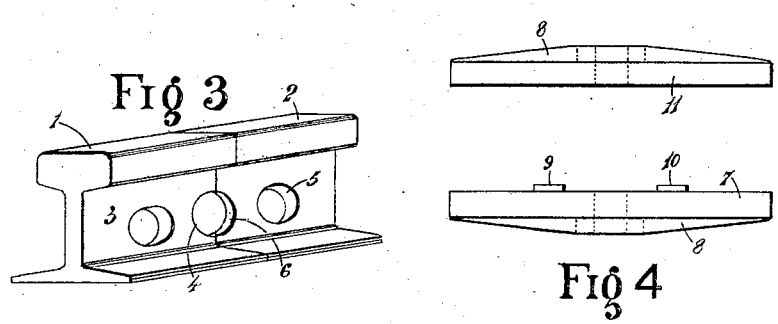
Fig 3
Fig 4
Inventor: Gilbert Thomas Wilson
Witnesses:
By Baldwin & Rayward
Attorneys.

UNITED STATES PATENT OFFICE.

GILBERT THOMAS WILSON, OF WELLINGTON, NEW ZEALAND.

RAILWAY FISH-PLATE.

No. 879,935.　　　Specification of Letters Patent.　　　Patented Feb. 25, 1908.

Application filed May 14, 1907. Serial No. 373,626.

*To all whom it may concern:*

Be it known that I, GILBERT THOMAS WILSON, a subject of His Majesty the King of Great Britain and Ireland, residing at 71 Lambton Quay, Wellington, in the Provincial District of Wellington, in the Colony of New Zealand, have invented certain new and useful Improvements in Railway Fish-Plates, of which the following is a specification.

The invention relates to means employed for joining the ends of railway rails, girders, beams and the like. According hereto two jaws are employed respectively shaped to fit upon opposite sides of the ends to be joined. One jaw has projecting lugs which respectively pass into holes formed in each of said ends and a bolt passes through one jaw and through a hole formed by corresponding recesses in the ends and screws into a threaded hole in the opposing jaw.

For purposes of illustration the invention is shown in the drawing as applied to the joining of two railway rails and in said drawing—Figure 1 is a transverse sectional elevation, Fig. 2 an end perspective elevation, Fig. 3 a similar view to Fig. 2 with the jaws removed, and Fig. 4 a plan of the jaws. Fig. 3 shows two rails 1 and 2 respectively which are to be connected. Rail 1 has the hole 3 through the web and a semicircular recess 4 in its end. The rail 2 has the hole 5 in the web and the semi-circular recess 6 in its end.

Referring now to Figs. 1, 2 and 4 the jaw 7 has the stiffening ribs 8 and upon its inner face which is shaped to fit between the head and the flange of the tail, are the lugs 9 and 10 which pass freely into the holes 3 and 5 in the respective rails. The jaw 11 is shaped to fit between the head and flange of the rail upon the side opposite to jaw 7 and a bolt 12 passing through a hole in the jaw 7, through the hole formed by the corresponding semi-circular recesses 4 and 6 in the rail ends, screws through a threaded hole in the jaw 11 and has a nut 14 upon its end. A thin metal liner 15 extending the length of the jaw may be inserted between the top of the jaw 11 and the rail head as shown in Fig. 1 but this may usually be dispensed with.

What I do claim and desire to secure by Letters Patent of the United States is:—

1. A jointing device comprising in combination a jaw having a pair of projecting lugs adapted to take into holes in the respective parts to be joined, a second jaw having a screw threaded hole, a bolt passing through a hole in the first jaw and screwing into the threaded hole in the second jaw substantially as specified herein.

2. In jointing devices in combination with two parts to be joined, a jaw having projecting lugs thereon respectively passing into holes formed in each of said parts, a bolt adapted to pass through a hole in said jaw, the parts to be joined having corresponding semi-circular recesses in their ends which together form a hole for the passage of the bolt, and a second jaw having a screw threaded hole through which the bolt is screwed substantially as specified.

In testimony whereof I have signed my name to this specification in the presence of two witnesses.

GILBERT THOMAS WILSON.

Witnesses:
　HENRY JOHN PRIOR,
　PERCY BARNETT WRIGHT.